United States Patent Office 2,950,999
Patented Aug. 30, 1960

2,950,999
LOW-TEMPERATURE DRY CELL

David Norman Craig and John Philip Schrodt, Washington, D.C., assignors to the United States of America as represented by the Secretary of the Navy No Drawing. Filed Mar. 18, 1944, Ser. No. 527,148

8 Claims. (Cl. 136—155)

(Granted under Title 35, U.S. Code (1952), sec. 266)

This invention relates to a new and improved type of low-temperature dry cell and has particular relation to an electrolyte solution for use therein.

In dry cells for low-temperature service, the electrolyte should have a eutectic point at a temperature below that anticipated in the intended service. It is sometimes desirable that dry cells be operative and have their normal operating characteristics at temperatures from −20° C. to −50° C. The ordinary dry cell becomes inoperative at about −20° C. At this temperature, the electrolyte solution freezes and the internal resistance of the cell becomes very high. The electromotive force of the ordinary cell is maintained at this temperature, provided that the current drawn from the cell is infinitesmal, but for practical purposes such a current is too small to meet the usual service requirements. In the ordinary sal ammoniac cell, the sal ammoniac crystallizes out of the solution at low temperatures and zinc chloride, which is ordinarily present in smaller amount, provides a relatively poor conductor.

An object of the present invention is to provide an electrolyte solution for a low-temperature dry cell which will permit the cell to have desirable characteristics at temperatures from −30° C. to −50° C.

Another object of the invention is to provide an electrolyte solution for a low-temperature dry cell which will permit the cell to have desirable characteristics, including satisfactory shelf life, at ordinary and low temperatures.

A further object of the invention is to provide an electrolyte solution for a low-temperature dry cell which will permit the cell to have high-flash currents at ordinary and low temperatures.

Still another object is to provide an electrolyte solution for a low-temperature dry cell which will be a good conductor at low temperatures and at the same time behave chemically in a manner compatible with ordinary service requirements of the cell.

An additional object of the invention is to provide an electrolyte solution for a low-temperature dry cell which will permit the cell to have a normal and high capacity when in use at ordinary and at low temperatures and yet be relatively free from local action when inactive.

A further object of the invention is to provide an electrolyte solution which will have desirable dry cell characteristics, including solubility of the salts contained therein, freezing temperature, viscosity, resistivity, temperature coefficient, acidity and satisfactory chemical reactions with other constituents of the cell, both at ordinary and at low temperatures. These and other objects of the invention will be better understood by reference to the accompanying description.

We have discovered that aqueous solutions of the hydrochloride salts of the simple amines, such as methylamine hydrochloride, dimethylamine hydrochloride, trimethylamine hydrochloride, ethylamine hydrochloride, diethylamine hydrochloride, triethylamine hydrochloride, ethylene diamine dihydrochloride, monoethanolamine hydrochloride and diethanolamine hydrochloride provide an electrolyte which is suitable for use in low-temperature dry cells and that the primary amine salt, monomethylamine hydrochloride, $CH_3NH_2HCl$, is particularly suitable for this purpose. We have further discovered that the addition of critical amounts of ammonium chloride, $NH_4Cl$, to these amine hydrochloride salt solutions, and in particular to the monomethylamine hydrochloride electrolyte solution, stabilizes the electrolyte, improves the shelf life and improves the desirable low-temperature characteristics of the cells.

In accordance with the present invention, the problem of obtaining a cell which will have desirable low-temperature characteristics and satisfactory performance and shelf life at room temperatures has been solved by providing an electrolyte consisting essentially of a eutectic mixture of water and methylamine hydrochloride, a small quantity of zinc chloride, and an ammonium chloride stabilizer which, in order to be effective, must be present in the electrolyte to the extent of 10% to 20% of the total weight of the electrolyte. We have found by experiment that when the electrolyte is saturated with methylamine hydrochloride at room temperatures, an excess amount of the methylamine hydrochloride precipitates out as the temperature of the cell is lowered, thereby increasing the internal resistance of the cell. On the other hand, if the electrolyte is too dilute, much ice is formed before the electrolyte reaches its eutectic point and again the internal resistance of the cell is increased. Thus it is essential that the concentration of methylamine hydrochloride be controlled within the limits of 17% to 50% by weight of solution and that the ammonium chloride stabilizer be present to the extent of approximately 10% to 20% and preferably 15% of the total weight of the electrolyte.

It will be understood that the method and materials used for constructing the standard components of the dry cell may be varied in accordance with the type of cell desired. The following examples are illustrative of the manner in which the new low-temperature cells containing the electrolyte of the present invention may be prepared in a preferred form.

EXAMPLE 1

The black mix is prepared to contain graphite and manganese dioxide in the ratio of 1:1, plus methylamine hydrochloride in 100% of the molecular proportions equivalent to the ammonium chloride as used in an ordinary dry cell, plus 100% of zinc chloride in equal proportions to those used in an ordinary dry cell. The paste contains flour and starch in the ratio of 1:2 respectively, plus methylamine hydrochloride in molecular proportions equivalent to the ammonium chloride used in an ordinary dry cell, plus zinc chloride also in molecular proportions to that used in an ordinary cell. Wetness of the black mix is tested by the application of pressure to the core of the mix and the number of pounds is read at the instant that the expelled electrolyte makes electrical contact through a sheet of toweling paper. An example of a preferred quantitative formula used in preparing a low-temperature dry cell containing the new electrolyte in accordance with the present invention is as follows:

The black mix is prepared to contain 117 grams of graphite (C), 114 grams of manganese dioxide ($MnO_2$), 29.8 grams of methylamine hydrochloride ($CH_3NH_2HCl$), 3.97 ml. of 45° Baumé of zinc chloride ($ZnCl_2$) and 30 ml. water. The paste contains 14.3 grams starch, 7.2 grams flour, 0.2 gram mercuric chloride ($HgCl_2$), 46.4 grams $CH_3NH_2HCl$, 4.23 ml. of 45° Baumé solution of $ZnCl_2$ and 46.2 grams water. As stated above, the amine salt, $ZnCl_2$ and water are added to the C—$MnO_2$ mix as a solution, hence the quantity may be varied to obtain the desired degree of wetness. The usual procedure is followed in making the cells, although minor variations may be made, such as a change in the time and temperature necessary for cooking and gelatinizing the paste.

Low-temperature dry cells of the standard Type D size made in accordance with the above example are fully as uniform in voltage and more uniform in flash current than ordinary Type D commercial cells. The present cells have an average deviation of .005 volt which is comparable to the average deviation of present commercial cells of similar types. The average flash current of these cells is 7.47 amperes with an average deviation of 0.21, whereas commercial cells have an average flash current of 8.51 amperes with an average deviation of 0.49. At a temperature of $-40°$ C. the present cells have an average voltage of approximately 1.50 volts and an average flash current of 2.14 amperes as compared with much lower voltage and no flash current for commercial cells. The shelf life of these cells at one month gave a reading of 89% of the initial readings and 64% of the initial readings at 3 months.

We have further discovered that the above-described low-temperature cell having an electrolyte including methylamine hydrochloride may be improved by the addition of a critical amount of a stabilizer such as ammonium chloride. This improved type of cell operates as a sal ammoniac cell at ordinary room temperatures and as the operating temperature is lowered, the $NH_4Cl$ begins to crystallize out of solution and the methylamine hydrochloride assumes an increased importance in the operation of the cell.

In order to provide a low-temperature dry cell, some of the electrolyte salts must be freely soluble at low temperatures of about $-40°$ C. or below. If the electrolyte contains a number of components, we have discovered that it is possible for one of them, such as $NH_4Cl$, to crystallize out at low temperatures without seriously impairing the performance of the cell. The methylamine hydrochloride fulfills the need for a soluble salt at low temperatures, whereas the $NH_4Cl$ has a definite stabilizing action and improves the shelf life of the cell. When the voltage of the cell is stabilized, the flash current is better maintained, there is less tendency to perforation of the zinc cans and the condition of the paste and the zinc adjacent to it is much better. Thus we have found that a combination of these two salts in certain definite proportions, together with the usual zinc chloride, provides a cell with normal or improved shelf life which is operative at ordinary and low temperatures.

The amount of ammonium chloride added as a stabilizer is particularly important. When the stabilizer is added in the amount of approximately 10% to 20%, the voltage and amperage remain sufficiently high to be comparable with present commercial cells and satisfactory shelf life is secured. When the stabilizer is added in the amount of 10% of the electrolyte, the solubility is sufficient for all of it to go into solution at room temperatures. It has been found that this is the limiting amount which can be dissolved by the methylamine hydrochloride. When 15% stabilizer is added, the preferred amount of the salt remains undissolved as a solid. The addition of less than 10% stabilizer is insufficient to maintain the desired shelf life and current maintenance and does not contribute materially to the performance of the cell at room temperatures. When an amount in excess of 20% stabilizer is added, an excess amount remains as a solid and the resistivity of the cell at low temperatures is penalized. Thus we have found by experiment that cells having less than approximately 10% or more than approximately 20% ammonium chloride in the electrolyte are of little value as low-temperature cells and that only cells having approximately 10% to 20% of the ammonium chloride stabilizer in the organic electrolyte can be classified as satisfactory low-temperature cells.

A formula for and method of preparing a low-temperature cell in accordance with a preferred form of the invention is as follows:

EXAMPLE 2

Formula for black mix:
    Manganese ore, 200 mesh _____gr__ 342
    Graphite, 200 mesh (artificial) _____gr__ 351
    Electrolyte solution _____ml__ 190

Formula for electrolyte:
    Methylamine hydrochloride _____gr__ 47.0
    Zinc chloride _____gr__ 3.0
    Ammonium chloride _____gr__ 17.8
    Water _____ml__ 50.0

The electrolyte solution is dissolved at 85° C. and cooled to 30° C. at which temperature some undissolved salts remain. The mixture is stirred continuously during the addition. An alternate method is to add considerable amount of the $NH_4Cl$ to the black mix in solid form. The wetness of the black mix should be from 450 to 500 lbs. per sq. in., which is approximately the pressure needed to expel the electrolyte from the mix in order to complete an electrical circuit through paper toweling. The pH of the mix should be from 5.2 to 5.3.

Formula for the paste:
    Part A—
        Cornstarch _____gr__ 41.5
        Water _____ml__ 56.5
        Mercuric chloride _____gr__ 0.3
    Part B—
        Flour _____gr__ 7.15
        Cornstarch _____gr__ 14.30
        Paste solution _____ml__ 91.00
        Mercuric chloride _____gr__ 0.37

Formula for the paste solution:
    Methylamine hydrochloride _____gr__ 47.0
    Water _____ml__ 50.0
    Zinc chloride _____gr__ 3.0

Three parts by volume of paste A are blended with one part by volume of paste B. In the preparation of size D cells, each can is prepasted twice with about 2.5 grams of paste at each application for a total of 5 grams of paste for each cell. The mix is tamped into the cell until the height is within proper limits, the total amount of mix being about 55 grams per cell.

Size D cells prepared in accordance with the above example gave the following operating characteristics as compared with similar cells similarly prepared with an electrolyte containing the minimum and maximum amounts of ammonium chloride stabilizer:

Table I

| Percent Stabilizer | Shelf Life | Voltage, Volts | Flash Current, Amperes | Current Maintenance, percent |
|---|---|---|---|---|
| 10 | 1 week | 1.58 | 13.49 | initial |
|    | 1 month | 1.55 | 13.02 | 97 |
|    | 3 months | 1.53 | 12.28 | 91 |
|    | 4.5 months | 1.52 | 11.02 | 86 |
|    | 6 months | 1.50 | 10.50 | 77.7 |
|    | 9 months | 1.46 | 6.04 | 44.6 |
| 15 | 1 week | 1.57 | 14.45 | initial |
|    | 1 month | 1.55 | 13.90 | 96 |
|    | 3 months | 1.54 | 13.45 | 93 |
|    | 4.5 months | 1.54 | 12.65 | 88 |
|    | 6 months | 1.52 | 11.80 | 82 |
|    | 9 months | 1.52 | 9.15 | 70.4 |
| 20 | 1 week | 1.61 | 15.2 | initial |
|    | 1 month | 1.56 | 13.5 | 89 |
|    | 3 months | 1.56 | 13.0 | 85 |

The invention herein described may be manufactured and used by or for the Government of the United States of America for governmental purposes without the payment of any royalties thereon or therefor.

We claim:
1. An electrolyte for low-temperature dry cells, com- prising an aqueous solution of approximately 47% methylamine hydrochloride, and as a stabilizer therefor ammonium chloride in the amount of from 10% to 20% by weight of said solution.

2. An aqueous electrolyte for good low-temperature dry cell operation including approximately 47% methylamine hydrochloride by weight.

3. An electrolyte for low-temperature dry cells comprising an aqueous solution of approximately 17% to 50% methylamine hydrochloride, and up to 10% zinc chloride by weight of said solution.

4. An electrolyte for use in low-temperature dry cells comprising an aqeous solution of approximately 47% methylamine hydrochloride and 3% zinc chloride by weight of said solution.

5. An electrolyte for low-temperature dry cells comprising an aqueous solution of approximately 17 to 50% methylamine hydrochloride, and as a stabilizer therefor ammonium chloride in the amount of from 10% to 20% by weight of said solution.

6. An electrolyte for low-temperature dry cells comprising an aqueous solution of approximately 47% methylamine hydrochloride, and as a stabilizer therefor ammonium chloride in the amount of approximately 15% by weight of said solution.

7. An electrolyte for low-temperature dry cells comprising an aqueous solution of approximately 17% to 50% methylamine hydrochloride, 10% to 20% ammonium chloride, and up to 10% zinc chloride by weight of solution.

8. An electrolyte for low-temperature dry cells comprising a solution of approximately 40% methylamine hydrochloride, 2.5% zinc chloride, 42.5% water, and as a stabilizer therefor 15% ammonium chloride.

References Cited in the file of this patent
UNITED STATES PATENTS

| | | |
|---|---|---|
| 1,437,553 | Reed | Dec. 5, 1922 |
| 2,164,755 | Marhenkel | July 4, 1939 |

FOREIGN PATENTS

| | | |
|---|---|---|
| 283,559 | Great Britain | Apr. 12, 1928 |

OTHER REFERENCES

Otto, Morehouse and Vinal: Trans. Electrochemical Society, vol. 90 (1946), pages 419–431.